US012717216B2

(12) United States Patent
Sugahara

(10) Patent No.: US 12,717,216 B2
(45) Date of Patent: Aug. 25, 2026

(54) IMAGING METHOD, LEARNING METHOD, LEARNING DATA GENERATING DEVICE, AND DATA STRUCTURE

(71) Applicant: KYOCERA Corporation, Kyoto (JP)

(72) Inventor: Shun Sugahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/881,182

(22) PCT Filed: Jul. 7, 2023

(86) PCT No.: PCT/JP2023/025336
§ 371 (c)(1),
(2) Date: Jan. 3, 2025

(87) PCT Pub. No.: WO2024/014415
PCT Pub. Date: Jan. 18, 2024

(65) Prior Publication Data
US 2026/0010055 A1 Jan. 8, 2026

(30) Foreign Application Priority Data
Jul. 13, 2022 (JP) ................................ 2022-112719

(51) Int. Cl.
*H04N 15/00* (2006.01)
*G03B 15/00* (2021.01)
(Continued)

(52) U.S. Cl.
CPC ............ *G03B 15/00* (2013.01); *G03B 37/00* (2013.01); *G06V 10/774* (2022.01)

(58) Field of Classification Search
None
See application file for complete search history.

(56) References Cited

U.S. PATENT DOCUMENTS 9,990,534 B2 * 6/2018 Kakita .................... G06F 18/23
10,681,268 B2 * 6/2020 Yamamoto ............ G06T 1/0007
(Continued)

FOREIGN PATENT DOCUMENTS

| | | | |
|---|---|---|---|
| JP | H11-311832 | A | 11/1999 |
| JP | 2004-279556 | A | 10/2004 |
| WO | 2019/150983 | A1 | 8/2019 |

OTHER PUBLICATIONS

Duan et al.; "Develop Then Rival: A Human Vision-Inspired Framework for Superimposed Image Decomposition"; IEEE Transactions on Multimedia; May 5, 2022; pp. 4267-4281; vol. 25; IEEE; URL: https://ieeexplore.ieee.org/document/9769950.

*Primary Examiner* — James M Hannett
(74) *Attorney, Agent, or Firm* — Studebaker Brackett PLLC

(57) ABSTRACT

This imaging method includes capturing a third image using an imaging device. The imaging device includes an imaging element, an optical system, and an optical element. The optical system forms an image in a light-receiving area from incident first light. The optical element guides second light to the light-receiving area. An angle between an optical axis of the optical system and a principle ray that enters the optical system is different for the first light and the second light. The third image is an image obtained when the first image and the second image are simultaneously displayed on a display. The first image is formed by an object point that radiates the first light. The second image is formed by an object point that radiates the second light.

8 Claims, 11 Drawing Sheets

(51) Int. Cl.
*G03B 37/00* (2021.01)
*G06V 10/774* (2022.01)

(56) References Cited

U.S. PATENT DOCUMENTS

| | | | | |
|---|---|---|---|---|
| 2002/0180759 | A1* | 12/2002 | Park | H04N 9/8227<br>348/E7.086 |
| 2004/0179125 | A1 | 9/2004 | Nagaoka | |
| 2009/0167929 | A1 | 7/2009 | Nagaoka | |

* cited by examiner

IMAGING METHOD, LEARNING METHOD, LEARNING DATA GENERATING DEVICE, AND DATA STRUCTURE

CROSS-REFERENCE TO RELATED APPLICATIONS

This application claims priority from Japanese Patent Application No. 2022-112719 filed in Japan on Jul. 13, 2022, and the entire disclosure of this application is hereby incorporated by reference.

TECHNICAL FIELD

The present disclosure relates to an imaging method, a learning method, a learning data generating device, and a data structure.

BACKGROUND OF INVENTION

An imaging optical system that forms an image of an observation target has various physical properties such as focal length and angle of view. As the focal length increases, an image is formed in which the observation target is expanded, and therefore detailed optical information about a distant observation target, or in other words, expanded optical information can be obtained. The greater the angle of view, the more optical information about an observation target located over a wide range can be obtained. However, there is a trade-off relationship between focal length and angle of view, and as the focal length increases, the angle of view decreases, and as the focal length decreases, the angle of view increases.

Therefore, the focal length is adjusted in order to obtain the desired optical information depending on the situation. For example, the focal length is adjusted by moving a zoom lens contained in the imaging optical system. In addition, the focal length is adjusted by switching between multiple single-focus lenses (refer to Patent Literatures 1 and 2).

CITATION LIST

Patent Literature

Patent Literature 1: Japanese Unexamined Patent Application Publication No. 11-311832

Patent Literature 2: Japanese Unexamined Patent Application Publication No. 2004-279556

SUMMARY

In a First Aspect, an imaging method includes capturing a third image using an imaging device.

The third image is an image obtained when a first image and a second image are simultaneously displayed on a display.

The first image is formed by an object point radiating first light.

The second image is formed by an object point radiating second light.

The imaging device includes an imaging element having a light-receiving area, an optical system configured to form an image from the first light, incident thereto, in the light-receiving area, and an optical element configured to guide the second light to the light-receiving area.

An angle formed between an optical axis of the optical system and a principle ray incident to the optical system is different for the first light and the second light.

In a Second Aspect, a learning method includes training an image processing model using a first superimposed image generated by an imaging device capturing a third image and images respectively corresponding to a first image and a second image in an imaging method.

The image processing model is configured to separate a second superimposed image, captured by the imaging device, into a first image component and a second image component.

The first image component corresponds to an object point radiating first light.

The second image component corresponds to an object point radiating second light.

The imaging method captures the third image using the imaging device.

The third image is an image obtained when the first image and the second image are simultaneously displayed on a display.

The first image is formed by the object point radiating the first light. The second image is formed by the object point radiating the second light.

The imaging method stores the first superimposed image in association with images respectively corresponding to the first image and the second image.

The imaging device includes an imaging element having a light-receiving area, an optical system configured to form an image from the first light, incident thereto, in the light-receiving area, and an optical element configured to guide the second light to the light-receiving area. An angle formed between an optical axis of the optical system and a principle ray incident to the optical system is different for the first light and the second light.

In a Third Aspect, a learning data generating device includes an imaging device, a display, and an information processing device.

The imaging device includes an imaging element having a light-receiving area, an optical system configured to form an image from incident first light in the light-receiving area, and an optical element configured to guide second light to the light-receiving area, an angle formed between an optical axis of the optical system and a principle ray incident to the optical system being different for the first light and the second light. The display is located within a field of view of the imaging device.

The information processing device is configured to cause the imaging device to capture a third image, the third image being an image obtained when a first image and a second image are simultaneously displayed on the display, the first image formed by an object point radiating the first light, and the second image formed by an object point radiating the second light.

In a Fourth Aspect, a data structure is a data structure used to train an image processing model.

The image processing model is configured to separate a second superimposed image into a first image component and a second image component, the first image component and the second image component being superimposed in the second superimposed image, the first image component corresponding to an object point radiating first light, and the second image component corresponding to an object point radiating second light.

The data structure includes: the first image formed by the object point radiating the first light; the second image formed by the object point radiating the second light; a first superimposed image created by superimposing the first image and the second image; and correspondence information representing a correspondence between the first image, the second image, and the first superimposed image.

The image processing model is trained using a combination of the first image, the second image, the first superimposed image, and the correspondence information as training data.

DESCRIPTION OF EMBODIMENTS

Figure 1:
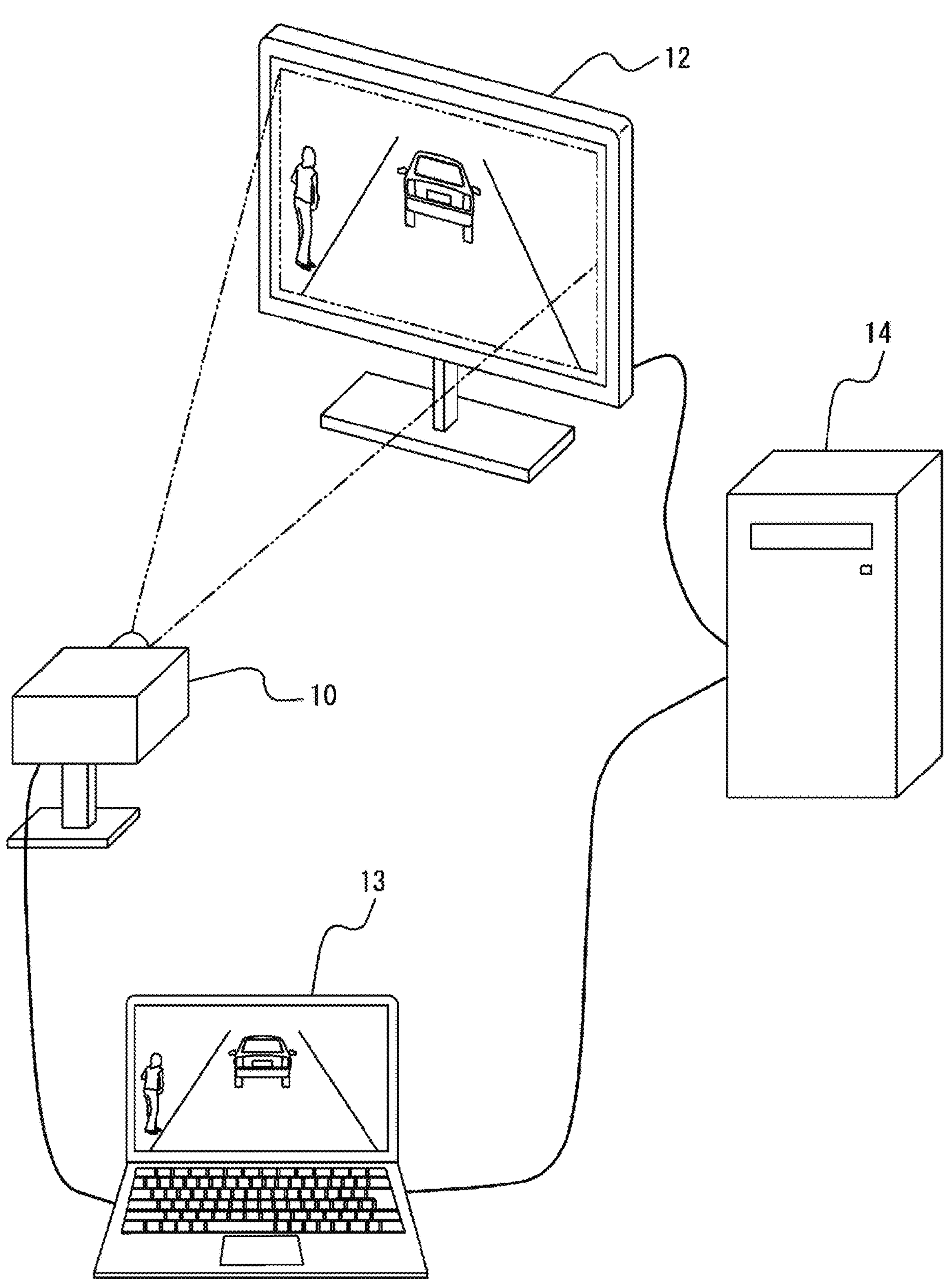
FIG. 1 is an exterior view illustrating the outline configuration of a learning data generating device including an imaging device used in an imaging method according to this embodiment.

Embodiments of the present disclosure will be described below while referring to the drawings. In the drawings referred to below, the same components are designated by the same symbols.

As illustrated in FIG. 1, a learning data generating device 11 includes an imaging device 10 used in an imaging method according to an embodiment of the present disclosure. The learning data generating device 11 includes the imaging device 10, a display 12, and an information processing device 13. The learning data generating device 11 may further include a providing device 14 that provides image data.

The learning data generating device 11 may generate data for training an image processing model applied to the imaging device 10. The image processing model separates a second superimposed image generated by the imaging device 10 into a first image component and a second image component. As described below, the learning data generating device 11 generates learning data by causing the imaging device 10 to capture an image that the information processing device 13 has displayed on the display 12.

The imaging device 10 may be a mass-produced product. The imaging device 10 may be used by the learning data generating device 11 before being given the parameters of the image processing model. Learning data may be generated by the learning data generating device 11 using the imaging device 10. The parameters of the image processing model can be generated through training using learning data. The parameters may be given to another imaging device 10.

Figure 2:
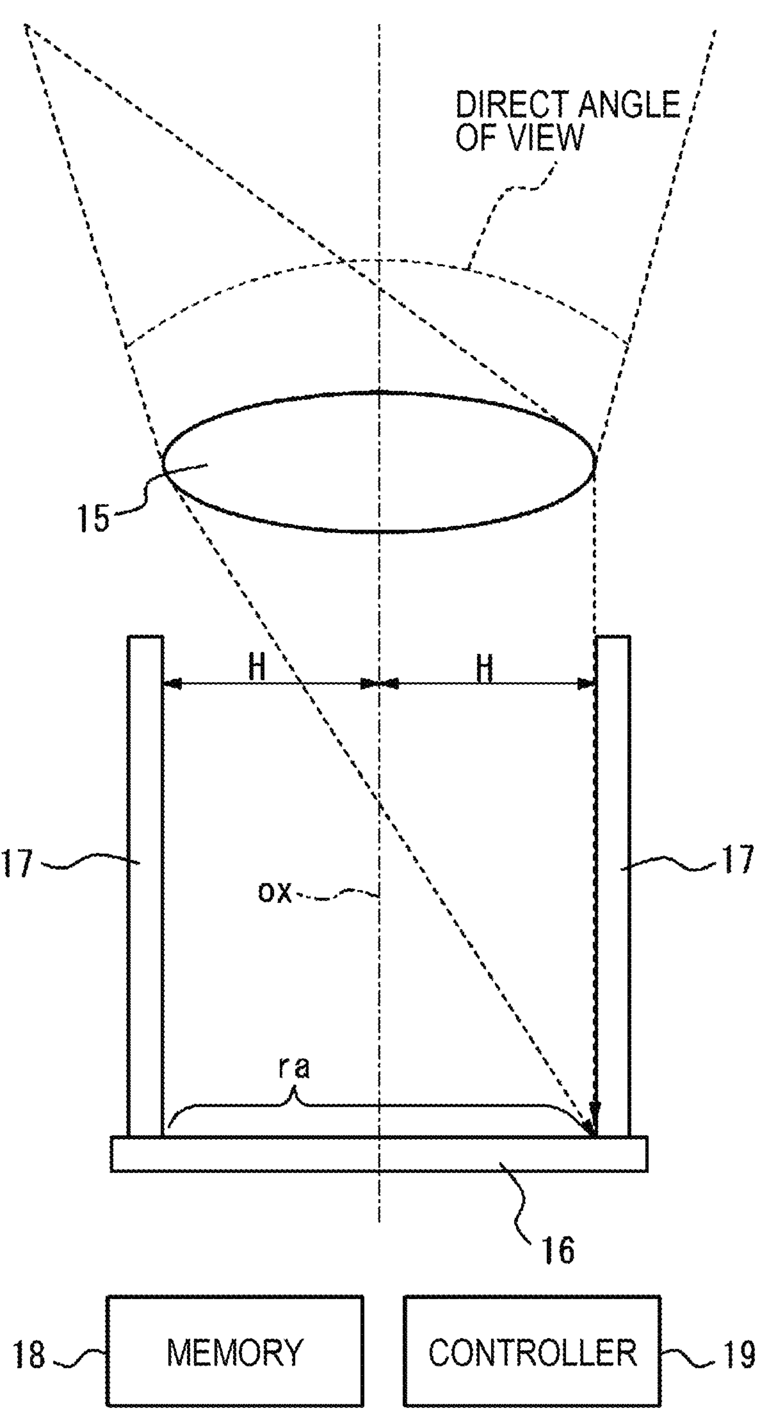
FIG. 2 is a configuration diagram illustrating an outline configuration of the imaging device in FIG. 1.

As illustrated in FIG. 2, the imaging device 10 includes an imaging optical system (optical system) 15, an imaging element 16, and an optical element 17. The imaging device 10 may further include a memory 18 and a controller 19.

The imaging optical system 15 forms an image of a subject from incident light flux. The imaging optical system 15 forms an image from incident first light in a light-receiving area of the imaging element 16, which will be described later, in the imaging device 10. The first light may be light radiated by an object point located within the angle of view of the imaging optical system 15. Hereafter, the angle of view of the imaging optical system 15 itself, in other words, a configuration not including the optical element 17, is also referred to as the direct angle of view. The imaging optical system 15 may be configured using an optical element that forms an image from light flux radiated from object points, which are at different positions from each other, at different image points by itself, in other words, without the optical element 17. Examples of an optical element constituting the imaging optical system 15 include, for example, lenses, mirrors, and apertures.

The imaging optical system 15 does not need to be telecentric on the image side. In other words, the angle of the principle ray of any light flux passing through the imaging optical system 15 with respect to the optical axis may be greater than 0°.

The imaging element 16 has a light-receiving area ra. The imaging element 16 captures an image formed within the light-receiving area ra via the imaging optical system 15. The imaging element 16 may be capable of capturing visible light and invisible light such as infrared light and ultraviolet light. The imaging element 16 is, for example, a CCD (charge-coupled device) image sensor or a CMOS (complementary metal-oxide semiconductor) image sensor. The imaging element 16 may be a color image sensor. In other words, multiple pixels disposed in the light-receiving area ra of the imaging element 16 may be covered with, for example, RGB color filters so as to be evenly distributed within the light-receiving area ra. The imaging element 16 generates an image signal corresponding to the image received by the imaging. The imaging element 16 may generate the image signal at a prescribed frame rate such as 30 fps.

In the imaging element 16, the outer edge of the light-receiving area ra on the side where the optical element 17, which is described below, is provided may be positioned outside the outer edge of an exit pupil of the imaging optical system 15. Outside the outer edge of the exit pupil means outside with respect to an optical axis ox of the imaging optical system 15. The light-receiving area ra may be rectangular.

The optical element 17 guides second light to the light-receiving area. An angle between the optical axis ox of the imaging optical system 15 and a principle ray that enters the imaging optical system 15 is different for the first light and the second light. The second light may be light radiated from an object point located outside the angle of view of the imaging optical system 15, or in other words, outside the direct angle of view. The principle ray may be any one of the following: a ray passing through the center of an aperture of the imaging optical system 15, a ray passing through the center of an entrance pupil of the imaging optical system 15, or a ray at the center of the light flux radiated from any one object point and incident on the imaging optical system 15.

Furthermore, the optical element 17 may form an image from at least part of the light flux incident on the imaging optical system 15 from outside the direct angle of view of the imaging optical system 15 within the light-receiving area ra of the imaging element 16. The direct angle of view corresponds to the light-receiving area ra of the imaging element 16, and as mentioned above, is the angle of view of the imaging optical system 15 by itself, and is the angle of view corresponding to the range of object points that are captured within the light-receiving area ra without passing through the optical element 17.

The optical element 17 may be a mirror that reflects at least part of the light flux incident on the imaging optical system 15 and guides the light flux to the light-receiving area ra. The mirror may form an image from the second light incident on the imaging optical system 15 in the light-receiving area ra. The reflective surface of the mirror may be parallel to the optical axis ox of the imaging optical system 15. The reflective surface of the mirror may be parallel to any of the sides of the rectangular light-receiving area ra.

The mirror may be positioned outside the exit pupil of the imaging optical system 15 when looking in the direction of the optical axis ox of the imaging optical system 15. In more detail, the mirror may be disposed relative to the imaging optical system 15 so that the reflective surface of the mirror is positioned outside the exit pupil.

The mirror may include multiple flat mirrors. Two flat mirrors belonging to at least one set among the multiple flat mirrors may be positioned so that their reflective surfaces face each other and are parallel to each other. The outer edges of the light-receiving area ra of the imaging element 16 and the flat mirrors may be close together in the normal direction of the flat mirrors.

Figure 3:
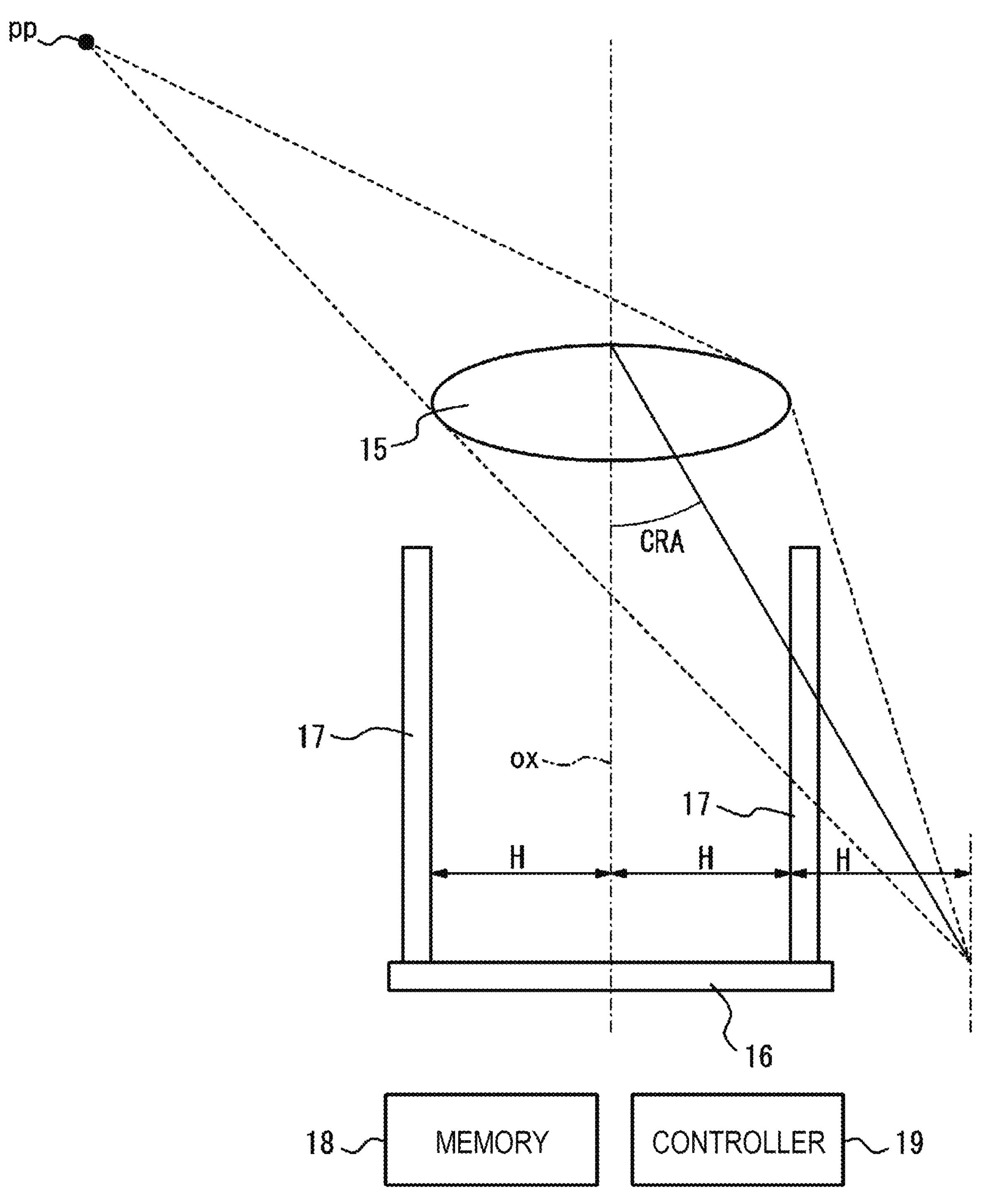
FIG. 3 is a diagram for describing the properties of an imaging element and an optical system in FIG. 2.

As illustrated in FIG. 3, a distance H between each of the two flat mirrors with parallel reflective surfaces and the optical axis ox may be identical. The two parallel flat mirrors, the imaging optical system 15, and the imaging element 16 may be designed and disposed so that $CRA \leq \tan^{-1}(H/B)$ is satisfied. CRA is the angle between the optical axis ox of the imaging optical system 15 and the principle ray of light from the imaging optical system 15 out of flux radiated from the object point pp at an angle twice the direct angle of view. B is the back focus of the imaging optical system 15.

Figure 4:
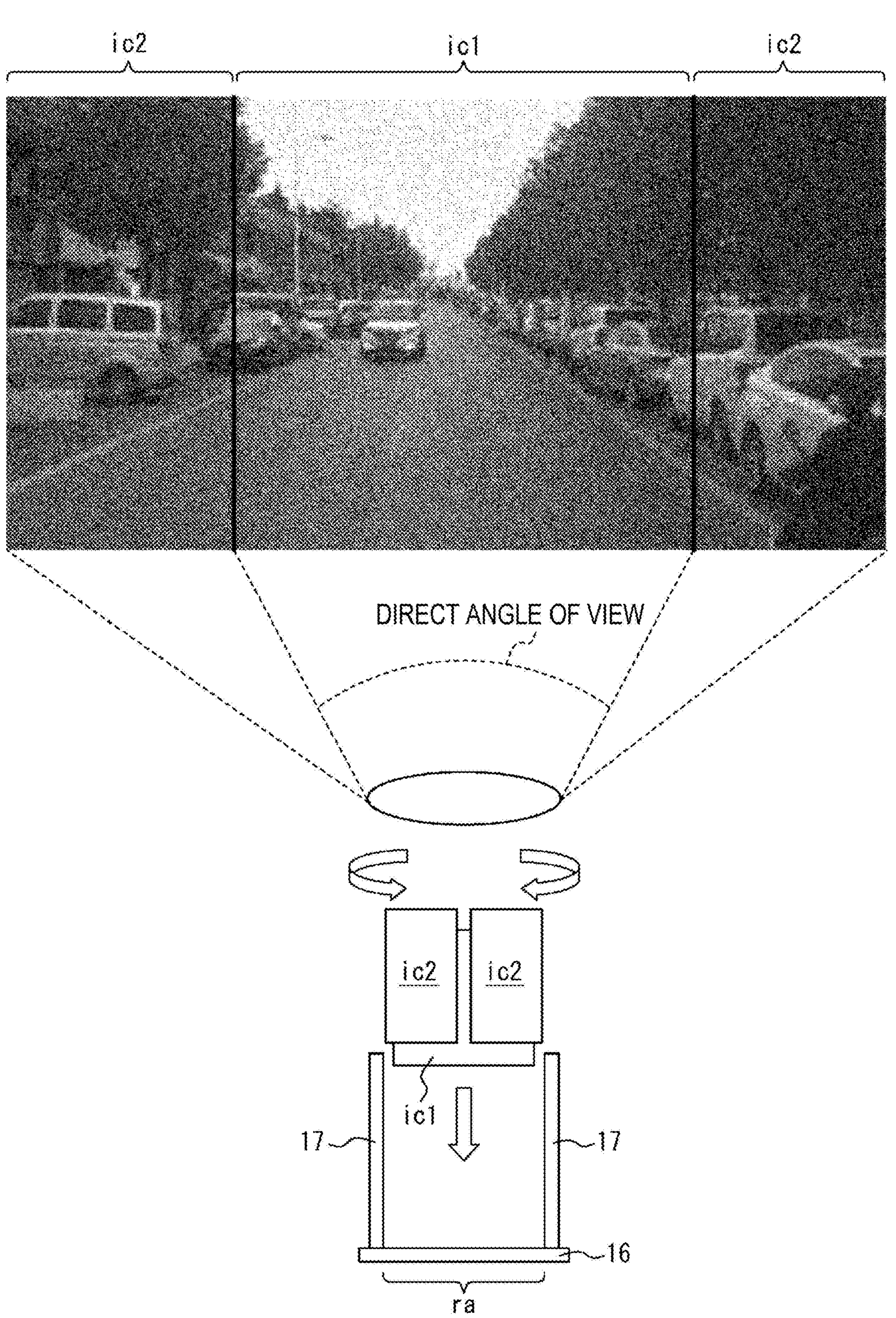
FIG. 4 is a conceptual diagram for describing an image that reaches a light-receiving area in FIG. 2.

With the above-described configuration, as illustrated in FIG. 4, a first image component ic1 corresponding to an object point within the direct angle of view, in other words, an object point that radiates the first light, reaches the light-receiving area ra of the imaging element 16 without passing through the optical element 17. The first image component ic1, which corresponds to an object point within the direct angle of view, more specifically corresponds to a subject image located within the direct angle of view. In addition, second image components ic2, which correspond to object points outside the direct angle of view, or in other words, object points that radiate the second light, reach the light-receiving area ra after being inverted via the optical element 17. In other words, the second image components ic2 are image components formed in the light-receiving area ra via the optical element 17. The second image components ic2, which correspond to object points outside the direct angle of view, more specifically correspond to subject images located outside the direct angle of view.

Figure 5:
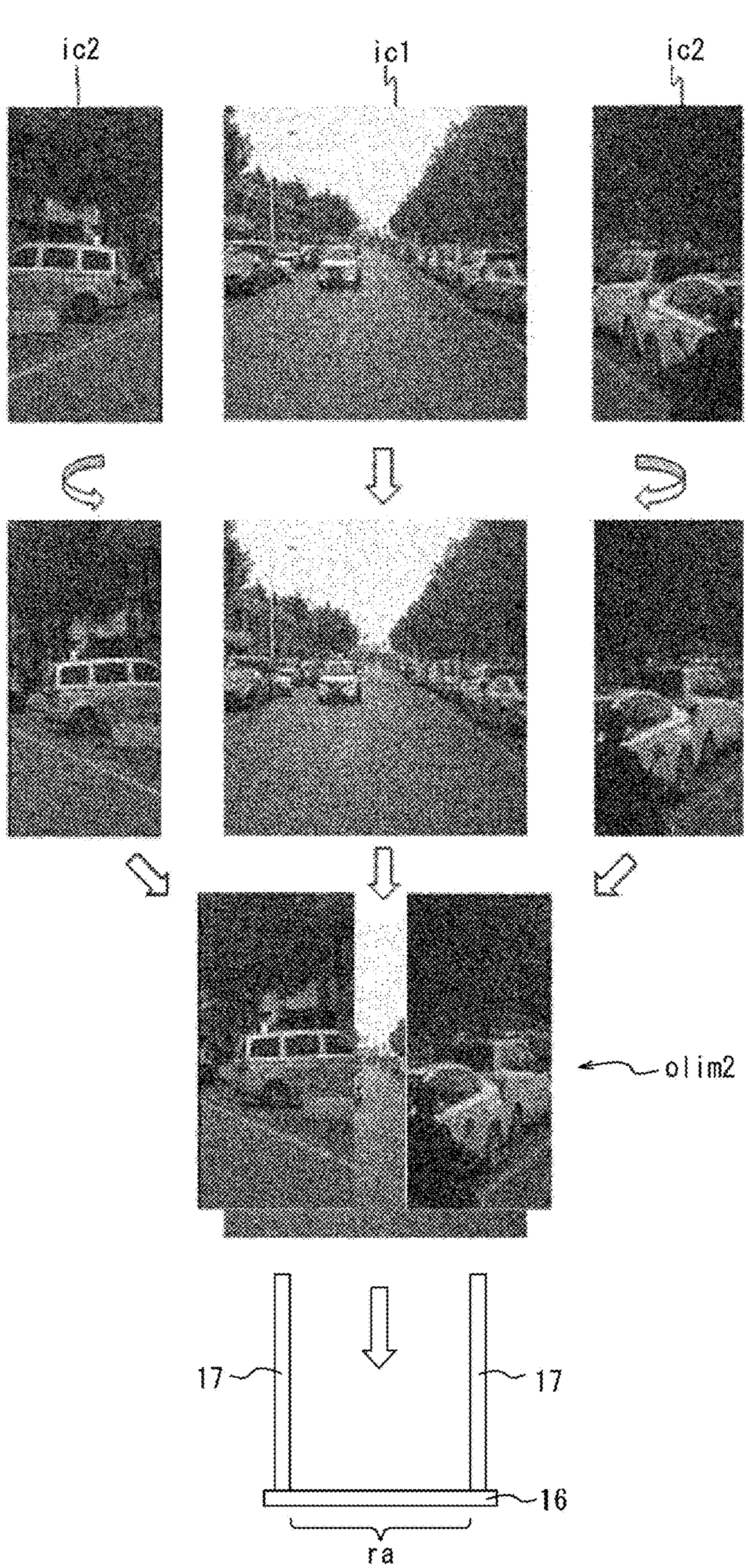
FIG. 5 is a conceptual diagram for describing a situation in which a superimposed image is formed that reaches the light-receiving area in FIG. 2.

In addition, with the above-described configuration, as illustrated in FIG. 5, the first image component ic1 and the second image components ic2, which are inverted in a configuration where the optical element 17 is a mirror, are superimposed with each other in the light-receiving area ra. Therefore, the imaging element 16 captures a second superimposed image olim2, including the first image component ic1 and the inverted second image components ic2 in a configuration where the optical element 17 is a mirror.

The memory 18 includes any suitable storage device such as a RAM (random access memory) and a ROM (read only memory). The memory 18 may store various programs that allow the controller 19 to function and various information used by the controller 19. The memory 18 may, for example, store the parameters of a general-use image processing model mentioned above. However, in the imaging device 10 that is applied to the learning data generating device 11, the memory 18 does not need to store the parameters.

The controller 19 includes at least one processor, at least one dedicated circuit, or a combination thereof. The processor can be a general-purpose processor such as a CPU (central processing unit) or a GPU (graphics processing unit), or a dedicated processor specialized for particular processing. A dedicated circuit may be, for example, a FPGA (field-programmable gate array) or an ASIC (application specific integrated circuit). The controller 19 may perform image processing on an image signal acquired from the imaging element 16.

Figure 6:
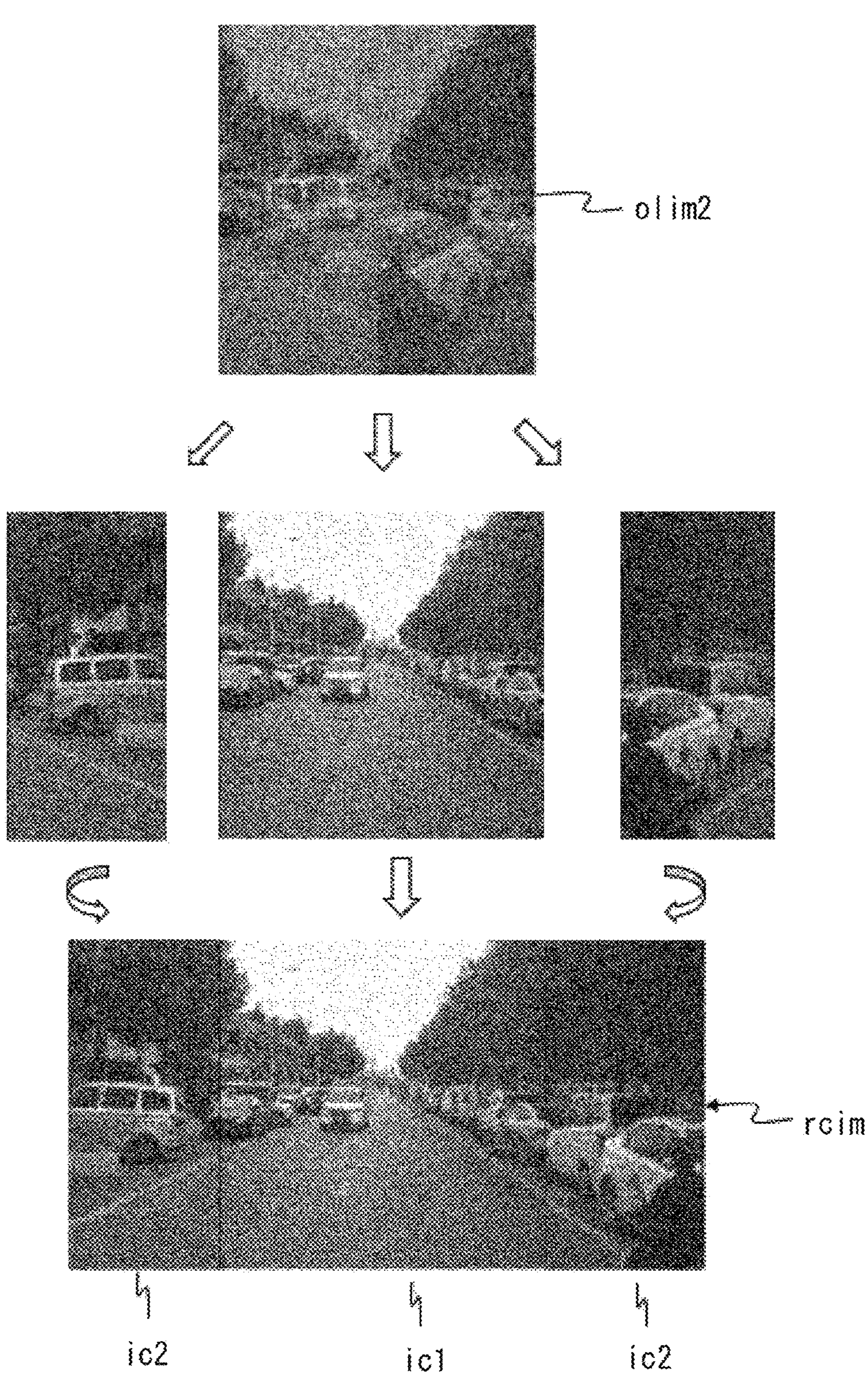
FIG. 6 is a conceptual diagram for describing a process in which a controller in FIG. 2 generates a reconstructed image from a superimposed image.

As illustrated in FIG. 6, the controller 19 may perform image processing to separate the second superimposed image olim2, which corresponds to the image signal, into the first image component ic1 and the second image components ic2 via the image processing. The controller 19 may separate the second superimposed image olim2 by using an image processing model. The image processing model is a model constructed by performing training using a first image and a second image as correct answers for a first superimposed image, which is created by superimposing the first image and the second image, as described below. An image separation model may be a Pix-to-Pix model that pits a generator that generates an image, such as an Encoder-Decoder model, against a discriminator that judges whether or not the generated image is a fake image, and generates a pair of images reflecting this relationship. The controller 19 may generate a reconstructed image rcim by combining the separated first image component ic1 and second image components ic2.

The controller 19 may use the reconstructed image rcim to measure the distance to a subject captured in the vicinity of the imaging device 10. For example, the controller 19 performs distance measurement using the reconstructed image rcim based on DFD (depth from defocus). The controller 19 may perform distance measurement using the reconstructed image rcim based on a motion disparity method (SLAM: simultaneous localization and mapping, motion stereo), a separation model based on deep learning, a foot distance measurement method, etc. The "foot distance measurement method" is a method of calculating 3D coordinates based on image coordinates, assuming that the lower edge of the subject image is positioned on the ground.

The controller 19 may generate a distance image based on the distance corresponding to each address of the reconstructed image rcim. A distance image is an image in which the pixel value of each pixel corresponds to a distance. The controller 19 may provide the distance image to an external device.

As illustrated in FIG. 1, the display 12 may display an image. The display 12 may include, for example, an LCD (liquid crystal display), a PDP (plasma display panel), or an OLED (organic electroluminescent display).

The display 12 is positioned within the field of view of the imaging device 10 in the learning data generating device 11.

In the learning data generating device 11, the display 12 may be disposed so that a display surface of the display 12 contains the entire field of view of the imaging device 10. The display 12 and the imaging device 10 may be positioned at relative positions and in relative orientations determined in advance in the learning data generating device 11. For example, the imaging device 10 and the display 12 may be disposed so that the optical axis ox of the imaging device 10 is perpendicular to the display surface of the display 12 and passes through the center of the display surface.

The providing device 14 may provide images of multiple frames to the display 12. The images of the multiple frames may be acquired in advance. The images of multiple frames may be generated by capturing images using an imaging device that can capture images of only the view within the direct angle of view without providing the optical element 17 unlike the imaging device 10 of the present application. The providing device 14 may, for example, store images of multiple frames constituting a video. The providing device 14 may provide images to the display 12 based on the control performed by the information processing device 13. The providing device 14 may provide images processed based on control performed by the information processing device 13 to the display 12. The providing device 14 may be integrated with the information processing device 13.

Figure 7:
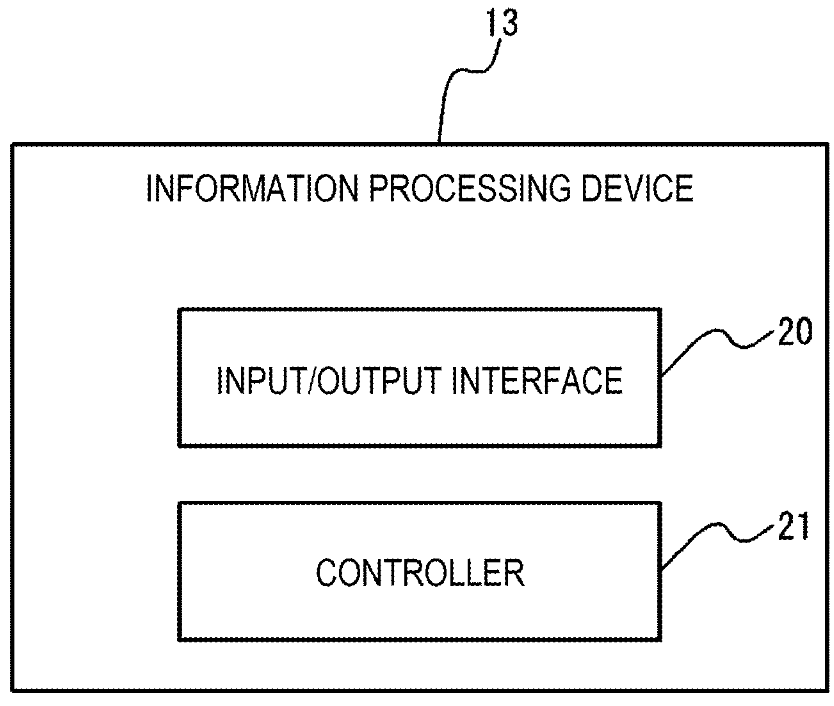
FIG. 7 is a functional block diagram illustrating the outline configuration of an information processing device in FIG. 1.

As illustrated in FIG. 7, the information processing device 13 may include an input/output interface 20 and a controller 21.

The input/output interface 20 may communicate information and commands with devices external to the information processing device 13. In the learning data generating device 11, the input/output interface 20 may be connected to the imaging device 10 and the providing device 14.

The controller 21 includes at least one processor, at least one dedicated circuit, or a combination thereof. The processor is a general-purpose processor such as a CPU or a GPU, or a dedicated processor specialized for particular processing. The dedicated circuit may be, for example, an FPGA or an ASIC.

The controller 21 may selectively assign a first mode and a second mode to the information processing device 13 as operation modes. In the first mode, the information processing device 13 may generate learning data. In the second mode, the information processing device 13 may be used to train an image processing model using learning data. The controller 21 may switch the operation mode to either the first mode or the second mode based on detection of an operation input to an input device such as a keyboard provided for the information processing device 13.

Figure 8:
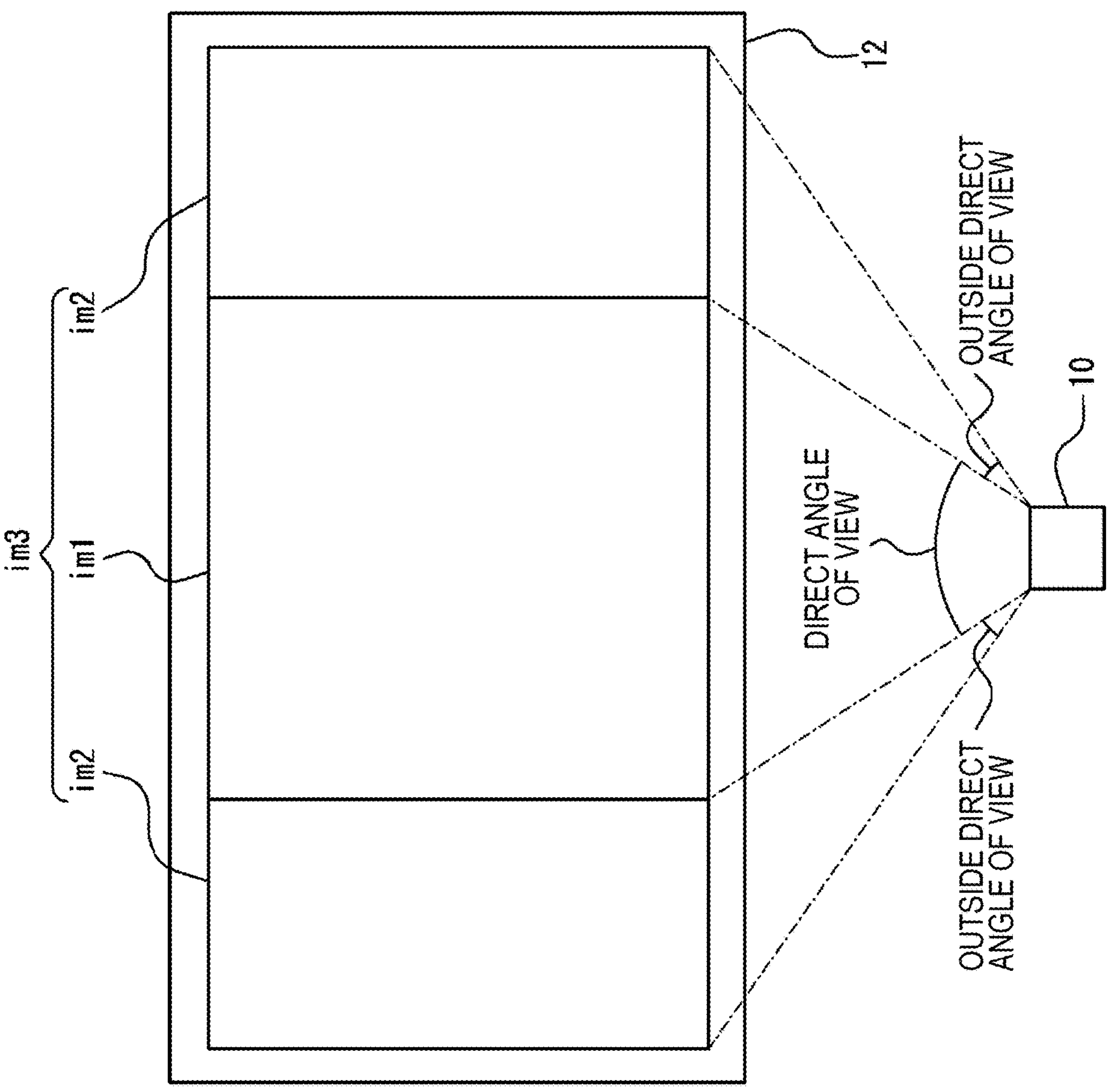
FIG. 8 is a diagram for describing a third image displayed on a display in FIG. 1.

In the first mode, the controller 21 may cause images to be displayed on the display 12 frame by frame by controlling the providing device 14. As illustrated in FIG. 8, the image of each frame contains multiple partial images. The partial image may include a first image im1 and second images im2. An image in which the first image im1 and the second images im2 are simultaneously displayed on the display 12 is called a third image im3.

The first image im1 is a partial image of the region formed by an object point within the direct angle of view, or in other words, the object point that radiates the first light. For example, the first image im1 may be a partial image displayed in the entire region within the direct angle of view of the imaging device 10 on the display 12 of the learning data generating device 11. The second images im2 are partial images of regions formed by object points that radiate light flux formed into an image in the light-receiving area ra via the optical element 17 of the imaging device 10, in other words, the object points that radiate the second light. For example, the second images im2 may be partial images displayed on the display 12 of the learning data generating device 11 in regions that are continuous with the first image im1 and are contained within a wider angular range than the direct angle of view.

As mentioned above, the relative position and relative orientation of the imaging device 10 with respect to the display 12 may be determined in advance. The controller 21 may recognize the region corresponding to the direct angle of view and the regions outside the direct angle of view at the designed relative position and relative orientation. The controller 21 may recognize the region corresponding to the direct angle of view and the regions outside the direct angle of view by calculating the regions based on the characteristics of the imaging optical system 15, such as the direct angle of view and focal length, of the imaging device 10. The controller 21 may recognize the region corresponding to the direct angle of view and the regions outside the direct angle of view calculated in advance based on the characteristics of the imaging optical system 15 by acquiring the regions from the imaging device 10, etc.

The controller 21 simultaneously displays the first image im1 and the second images im2 on the display 12. In a state where the first image im1 and the second images im2 are simultaneously displayed, the controller 21 causes the imaging device 10 to capture the simultaneously displayed third image im3. The controller 21 stores a first superimposed image generated by the imaging device 10 capturing the third image im3 in any memory. The memory may include at least one of a memory possessed by the information processing device 13, an external memory connected to the information processing device 13, or the providing device 14. In this embodiment, the memory may be the providing device 14.

After capturing the third image im3, the controller 21 displays the first image im1 and the second images im2 in the third image im3 separately on the display 12 in order. Displaying the images separately may mean that when the first image im1 is displayed, optical information that is substantially different amounts of light from each of the different object points outside the direct angle of view does not reach the light-receiving area ra of the imaging device 10. For example, when displaying the first image im1, the regions outside the direct angle of view may be displayed on the display 12 in a single color. In addition, displaying the images separately may mean that when the second images im2 are displayed, optical information that is substantially different amounts of light from each of the different object points inside the direct angle of view does not reach the light-receiving area ra of the imaging device 10.

The controller 21 may, for example, display the first image im1 by itself by performing image processing to mask the regions outside the direct angle of view of the third image im3 displayed on display 12 with black, for example. In addition, the controller 21 may, for example, display the second images im2 by themselves by performing image processing to mask the region inside the direct angle of view of the third image im3 displayed on display 12 with black, for example. The controller 21 may cause the providing device 14 to perform image processing to mask a specific region instead of the controller 21.

The controller 21 causes the imaging device 10 to capture the first image im1 with the first image im1 displayed by itself. The controller 21 causes the imaging device 10 to capture the second images im2 with the second images im2 displayed by themselves. The controller 21 may store, in the providing device 14, an image generated by the imaging device 10 capturing the first image im1, as an image corresponding to the first image im1, in association with the first superimposed image corresponding to the third image im3 including the first image im1. The controller 21 may store, in the providing device 14, images generated by the imaging device 10 capturing the second images im2, as images corresponding to the second images im2, in association with the first superimposed image corresponding to the third image im3 including the second images im2.

Instead of separately displaying and capturing the first image im1 and the second images im2, the controller 21 may acquire the first image im1 and the second images im2 contained in the third image im from the providing device 14 each time the third image im3 is captured. The controller 21 may store, in the providing device 14, the first image im1, which was acquired from the providing device 14, as an image corresponding to the first image im1, in association with the first superimposed image corresponding to the third image im3 including the first image im1. The controller 21 may store, in the providing device 14, the second images im2, which were acquired from the providing device 14, as images corresponding to the second images im2, in association with the first superimposed image corresponding to the third image im3 including the second images im2.

The controller 21 may generate the first superimposed image for each frame in a group of images of multiple frames such as a video, and store the first superimposed image, images corresponding to the first image im1, and images corresponding to the second images im2 in association with each other. The controller 21 generates sets in which the first superimposed image, an image corresponding to the first image im1, and an image corresponding to each of the second images im2 are associated with each other as learning data.

In the second mode, the controller 21 uses the learning data stored in the providing device 14 to train the image processing model. In other words, the controller 21 trains the image processing model using the first superimposed image and images generated by the imaging device 10 separately capturing the first image im1 and the second images im2. Alternatively, in the second mode, the controller 21 trains the image processing model using the first superimposed image and the first image im1 and the second images im2.

Figure 9:
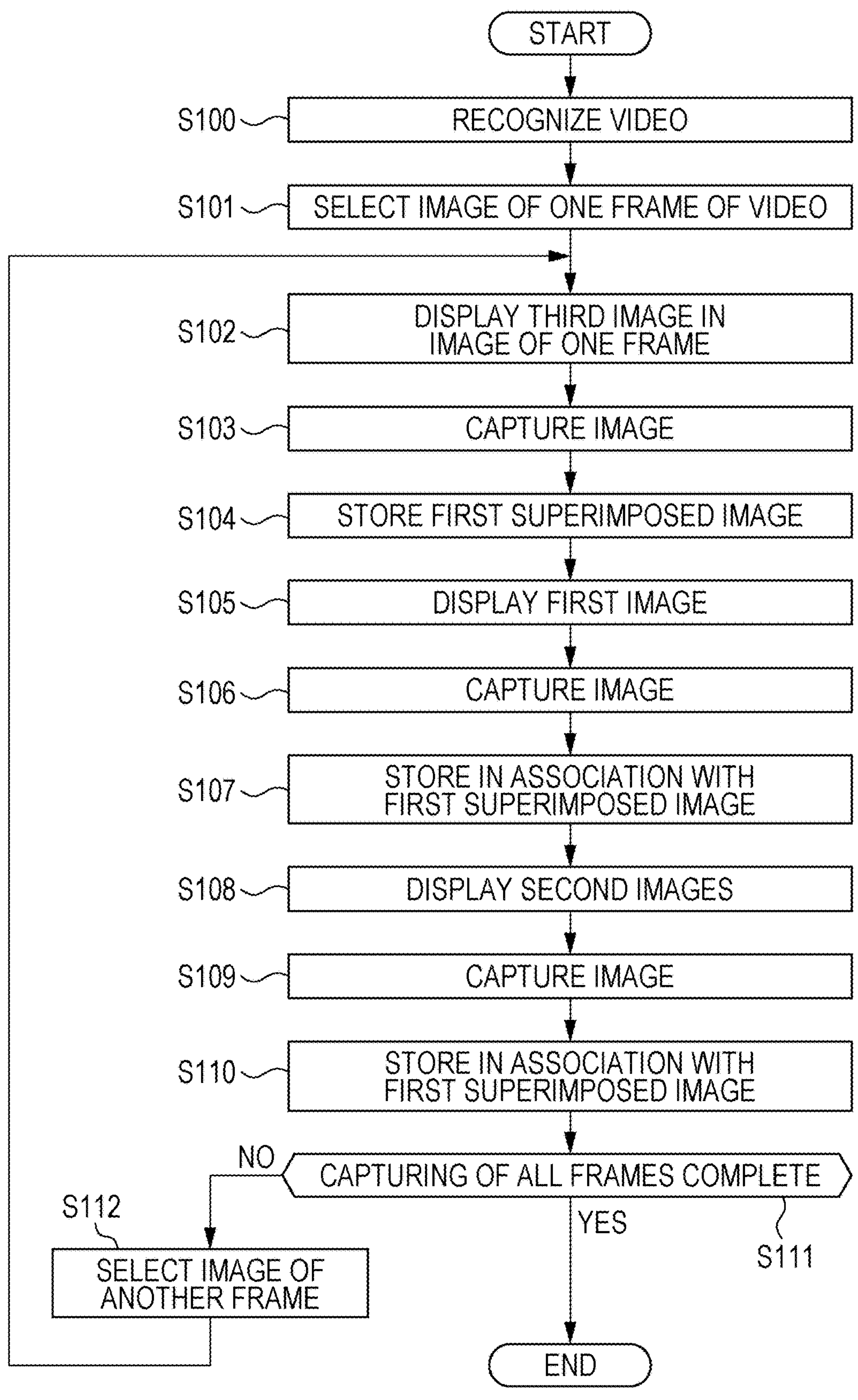
FIG. 9 is a flowchart for describing first generation processing performed by a controller in FIG. 7.

Next, first generation processing executed by the controller 21 in this embodiment will be described using the flowchart in FIG. 9. The first generation processing begins when the operation mode is switched to the first mode. The first generation processing is processing for generating learning data by displaying and capturing the first image im1 and the second images im2 separately.

In Step S100, the controller 21 recognizes a video to be used to generate the learning data from among videos stored in the providing device 14. The video recognition is based on the detection of an operation input to an input device such as a keyboard provided for the information processing device 13. After the recognition, the process advances to Step S101.

In Step S101, the controller 21 selects the image of one frame from among the images of among multiple frames constituting the video recognized in Step S100. The frames may be selected in the order in which they make up the video. After making this selection, the process advances to Step S102.

In Step S102, the controller 21 displays the first image im1 and the second images im2 of the image of the frame selected in Step S101 on the display 12 simultaneously. In other words, the controller 21 displays the third image im3 on the display 12. After displaying the image, the process proceeds to Step S103.

In Step S103, the controller 21 causes the imaging device 10 to capture the third image im3 in order to generate the first superimposed image. After capturing the image, the process advances to Step S104.

In Step S104, the controller 21 stores the first superimposed image generated in Step S103 in the providing device 14. After storing the image, the process advances to Step S105.

In Step S105, the controller 21 causes the first image im1 in the frame image selected in Step S101 to be separately displayed on the display 12. After displaying the image, the process advances to Step S106.

In Step S106, the controller 21 causes the imaging device 10 to capture the first image im1, and thereby generate an image corresponding to the first image im1. After capturing the image, the process advances to Step S107.

In Step S107, the controller 21 stores the image corresponding to the first image im1 generated in Step S106 in the providing device 14 in association with the first superimposed image stored in the providing device 14 in the immediately preceding Step S104. After storing the image, the process advances to Step S108.

In Step S108, the controller 21 causes the second images im2 in the frame image selected in Step S101 to be separately displayed on the display 12. After displaying the images, the process advances to Step S109.

In Step S109, the controller 21 causes the imaging device 10 to capture the second images im2, and thereby generate images corresponding to the second images im2. After capturing the images, the process advances to Step S110.

In Step S110, the controller 21 stores the images corresponding to the second images im2 generated in Step S109 in the providing device 14 in association with the first superimposed image stored in the providing device 14 in the immediately preceding Step S104. After storing the images, the process advances to Step S111.

In Step S111, the controller 21 determines whether or not capturing of images of the previous frames constituting the video recognized in Step S100 has been completed. If images of all the frames have been captured, the first generation processing is ended. If capturing of the previous frames is not complete, the process advances to Step S112.

In Step S112, the controller 21 selects the images of another frame of the frame images that have been captured, namely the first image im1, the second image im2, and the third image im3. After making this selection, the process advances to Step S102.

Figure 10:
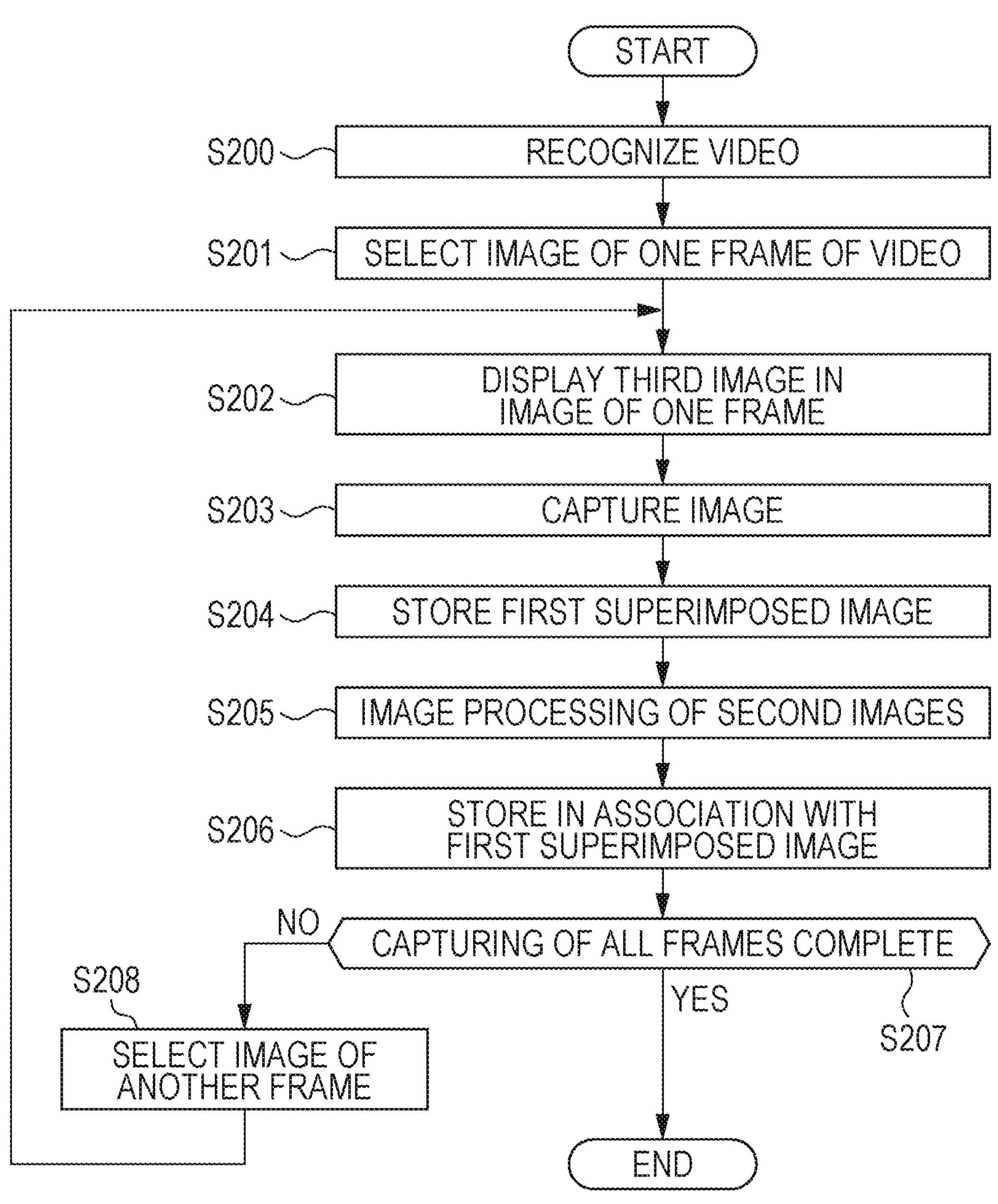
FIG. 10 is a flowchart for describing second generation processing performed by the controller in FIG. 7.

Next, second generation processing executed by the controller 21 in this embodiment will be described using the flowchart in FIG. 10. The second generation processing begins when the operation mode is switched to the first mode. The second generation processing is processing for generating learning data without displaying and capturing the first image im1 and the second images im2 separately.

In Steps S200 to S204, the controller 21 executes the same processing as Steps S100 to S104 in the first generation processing. After storing the first superimposed image in Step S204, the process advances to Step S205.

In Step S205, the controller 21 performs image processing to invert the second images im2 and then shift the second images im2 so that the second images im2 are included within the light-receiving area ra of the imaging device 10. After the image processing, the process advances to Step S206.

In Step S206, the controller 21 stores the first image im1 itself, which is the image of the frame selected in Step S201, in association with the first superimposed image stored in the providing device 14 in the immediately preceding Step S204, as an image corresponding to the first image im1. In addition, the controller 21 stores the second images im2, which were subjected to image processing in Step S205, in association with the first superimposed image stored in the providing device 14 in the immediately preceding Step S204, as images corresponding to the second images im2. After storing the images, the process advances to Step S207.

In Steps S207 and S208, the controller 21 executes the same processing as Steps S111 and S112 in the first generation processing.

Figure 11:
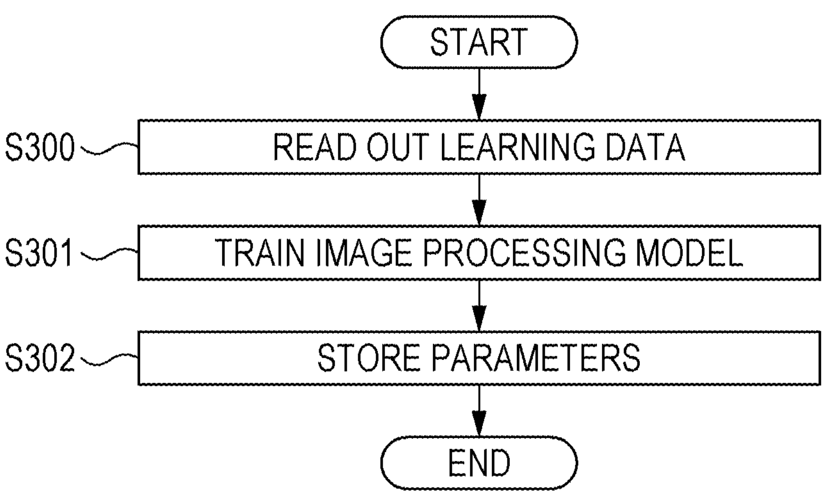
FIG. 11 is a flowchart for describing learning processing performed by the controller in FIG. 7.

Next, learning processing executed by the controller 21 in this embodiment will be described using the flowchart in FIG. 11. The learning processing begins when the operation mode is switched to the second mode.

In Step S300, the controller 21 reads out the learning data stored in the providing device 14 by the first generation processing or the second generation processing. After reading out the data, the process advances to Step S301.

In Step S301, the controller 21 trains the image processing model using the learning data read out in Step S300. The controller 21 generates parameters of the trained image processing model. After the training, the process advances to Step S302.

In Step S302, the controller 21 stores the parameters generated in Step S301 in the providing device 14. After storing the parameters, the learning processing ends.

In the imaging method using the information processing device 13 of this embodiment configured as described above, the imaging device 10 includes the optical element 17 that forms an image within the light-receiving area ra of the imaging element 16 from at least part of the light flux incident on the imaging optical system 15 from outside the direct angle of view of the imaging optical system 15 corresponding to the light-receiving area ra of the imaging element 16. The imaging device 10 is used to capture the third image im3. The third image im3 is created when the first image im1 formed by an object point within the direct angle of view and the second images im2 formed by object points that radiate the light flux that is formed into an image within the light-receiving area ra via the optical element 17 are simultaneously displayed on the display 12. With this configuration, the imaging method can generate the first superimposed image by making the imaging device 10 capture images that have been acquired in advance as information. A superimposed image obtained by performing processing to separate images that have been acquired in advance and inverting and superimposing portions of the images is an ideal superimposed image generated by the designed imaging device 10. Therefore, the superimposed image does not include the effects of mounting errors of the imaging optical system 15, the imaging element 16, and the optical element 17 in the actually manufactured imaging device 10. Therefore, when training an image processing model using the superimposed image, there may be a limit on the degree of improvement of the separation accuracy of the second superimposed image generated by the actually manufactured imaging device 10. On the other hand, since the imaging method can generate the first superimposed image, the image processing model can be trained to further improve the separation accuracy of the second superimposed image compared to when a superimposed image created by image processing is used. Therefore, the imaging method allows the imaging device 10 to be manufactured that produces wide-range expanded optical information.

In addition, in the imaging method of this embodiment, the first image im1 and the second images im2, which are displayed separately on the display 12, are captured using the imaging device 10. With this configuration, the imaging method can acquire a non-superimposed image whose pixel positions match those of the first superimposed image. Therefore, the imaging method can train the image processing model to further improve the separation accuracy of the second superimposed image.

In addition, in the imaging method of this embodiment, the first superimposed image is stored in association with the first image im1 and the second images im2, which are included in the third image im3. With this configuration, the imaging method can easily use each superimposed image as learning data when generating first superimposed images of multiple frames.

In an embodiment, (1) an imaging method includes capturing a third image using an imaging device, the third image being an image obtained when a first image and a second image are simultaneously displayed on a display, the first image formed by an object point radiating first light, the second image formed by an object point radiating second light, and the imaging device including an imaging element having a light-receiving area, an optical system configured to form an image from the first light, incident thereto, in the light-receiving area, and an optical element configured to guide the second light to the light-receiving area, an angle formed between an optical axis of the optical system and a principle ray incident to the optical system being different for the first light and the second light.

(2) In the imaging method of (1) above, the first image and the second image, separately displayed on the display, are also captured using the imaging device.

(3) In the imaging method of (1) or (2) above, a first superimposed image generated by the imaging device capturing the third image is stored in association with images respectively corresponding to the first image and the second image.

(4) In a learning method using the imaging method of (3) above, learning is performed for an image processing model using the first superimposed image generated by the imaging device capturing the third image in the imaging method and the images respectively corresponding to the first image and the second image, the image processing model being configured to separate a second superimposed image into a first image component and a second image component, the first image component and the second image component being superimposed in the second superimposed image, the first image component corresponding to the object point radiating the first light, and the second image component corresponding to the object point radiating the second light.

(5) In the learning method using the imaging method of (4) above, the images respectively corresponding to the first image and the second image are images generated by the imaging device separately capturing the first image and the second image.

(6) In the learning method using the imaging method of (4) above, the images respectively corresponding to the first image and the second image are the first image and the second image.

In an embodiment, (7) a learning data generating device includes:

an imaging device including an imaging element having a light-receiving area, an optical system configured to form an image from incident first light in the light-receiving area, and an optical element configured to guide second light to the light-receiving area, an angle formed between an optical axis of the optical system and a principle ray incident to the optical system being different for the first light and the second light;

a display located within a field of view of the imaging device; and an information processing device configured to cause the imaging device to capture a third image, the third image being an image obtained when a first image and a second image are simultaneously displayed on the display, the first image formed by an object point within the direct angle of view, and the second image formed by an object point radiating light flux formed into an image within the light-receiving area via the optical element.

In an embodiment, (8) a data structure is a data structure used to train an image processing model configured to separate a second superimposed image into a first image component and a second image component, the first image component and the second image component being superimposed in the second superimposed image, the first image component corresponding to an object point radiating first light, and the second image component corresponding to an object point radiating second light, the data structure including:

a first image formed by an object point radiating the first light;

a second image formed by an object point radiating the second light;

a first superimposed image created by superimposing the first image and the second image; and correspondence information representing a correspondence between the first image, the second image, and the first superimposed image, and the image processing model being trained using a combination of the first image, the second image, the first superimposed image, and the correspondence information as training data.

An embodiment of an imaging method using the imaging device 10 has been described above. Embodiments of the present disclosure can be a method or program for implementing a device, as well as a storage medium on which a program is recorded (for example, an optical disk, an optical-magnetic disk, a CD-ROM, CD-R, CD-RW, magnetic tape, hard disk, or memory card, and so on).

The embodiment of a program is not limited to an application program such as object code compiled by a compiler or program code executed by an interpreter, and can also take the form of a program module or the like incorporated into an operating system. Furthermore, the program may be or not be configured so that all processing is performed only in a CPU on a control board. The program may be configured to be implemented entirely or partially by another processing unit mounted on an expansion board or expansion unit added to the board as necessary.

The drawings illustrating the embodiments of the present disclosure are schematic drawings. The dimensional proportions and so on in the drawings do not necessarily match the actual dimensional proportions and so on.

Although embodiments of the present disclosure have been described based on the drawings and examples, please note that one skilled in the art can make various variations or changes based on the present disclosure. Please note that, therefore, these variations or changes are included within the scope of the present disclosure. For example, the functions and so on included in each constituent part can be rearranged in a logically consistent manner, and multiple constituent parts and so on can be combined into one part or divided into multiple parts.

For example, in this embodiment, the information processing device 13 generates learning data and trains the image processing model. However, the information processing device 13 does not need to train the image processing model and another information processing device may train the image processing model.

All of the constituent elements described in the present disclosure and/or all of the disclosed methods or all of the steps of disclosed processing can be combined in any combination, except for combinations in which their features would be mutually exclusive. Each of the features described in the present disclosure may be replaced by alternative features that serve the same, equivalent, or similar purposes, unless explicitly stated to the contrary. Therefore, unless explicitly stated to the contrary, each of the disclosed features is only one example of a comprehensive set of identical or equivalent features.

Furthermore, the embodiments according to the present disclosure are not limited to any of the specific configurations of the embodiments described above. The embodiments according to the present disclosure can be extended to all novel features, or combinations thereof, described in the present disclosure, or all novel methods, or processing steps, or combinations thereof, described in the present disclosure.

In the present disclosure, "first", "second", and so on are identifiers used to distinguish between such configurations. Regarding the configurations, "first", "second", and so on used to distinguish between the configurations in the present disclosure may be exchanged with each other. For example, identifiers "first" and "second" may be exchanged between a first image component and a second image component. Exchanging of the identifiers takes place simultaneously. Even after exchanging the identifiers, the configurations are distinguishable from each other. The identifiers may be deleted. The configurations that have had their identifiers deleted are distinguishable from each other by symbols. Just the use of identifiers such as "first" and "second" in this disclosure is not to be used as a basis for interpreting the order of such configurations or the existence of identifiers with smaller numbers.

REFERENCE SIGNS

10 imaging device
11 learning data generating device
12 display
13 information processing device
14 providing device
15 imaging optical system
16 imaging element
17 optical element
18 memory
19 controller
20 input/output interface
21 controller CRA angle between optical axis of imaging optical system and principle ray of light from imaging optical system out of light flux radiated from object point at angle twice direct angle of view
ic1 first image component
ic2 second image component
im1 first image
im2 second image
im3 third image
olim2 second superimposed image
ox optical axis
pp object point at angle twice direct angle of view
ra light-receiving area
rcim reconstructed image

The invention claimed is:

1. An imaging method comprising:

capturing a third image using an imaging device, the third image being an image obtained when a first image and a second image are simultaneously displayed on a display, the first image formed by an object point radiating first light, the second image formed by an object point radiating second light, and the imaging device including an imaging element having a light-receiving area, an optical system configured to form an image from the first light, incident thereto, in the light-receiving area, and an optical element configured to guide the second light to the light-receiving area, an angle formed between an optical axis of the optical system and a principle ray incident to the optical system being different for the first light and the second light.

2. The imaging method according to claim 1, wherein the first image and the second image, separately displayed on the display, are also captured using the imaging device.

3. The imaging method according to claim 1, wherein a first superimposed image generated by the imaging device capturing the third image is stored in association with images respectively corresponding to the first image and the second image included in the third image.

4. A learning method comprising:

training an image processing model using the first superimposed image generated by the imaging device capturing the third image in the imaging method according to claim 3 and the images respectively corresponding to the first image and the second image, the image processing model being configured to separate a second superimposed image into a first image component and a second image component, the first image component and the second image component being superimposed in the second superimposed image, the first image component corresponding to the object point radiating the first light, and the second image component corresponding to the object point radiating the second light.

5. The learning method according to claim 4, wherein the images respectively corresponding to the first image and the second image are images generated by the imaging device separately capturing the first image and the second image.

6. The learning method according to claim 4, wherein the images respectively corresponding to the first image and the second image are the first image and the second image.

7. A learning data generating device comprising:

an imaging device including an imaging element having a light-receiving area, an optical system configured to form an image from incident first light in the light-receiving area, and an optical element configured to guide second light to the light-receiving area, an angle formed between an optical axis of the optical system and a principle ray incident to the optical system being different for the first light and the second light;

a display located within a field of view of the imaging device; and an information processing device configured to cause the imaging device to capture a third image, the third image being an image obtained when a first image and a second image are simultaneously displayed on the display, the first image formed by an object point radiating the first light, the second image formed by an object point radiating the second light.

8. A data structure used to train an image processing model configured to separate a second superimposed image into a first image component and a second image component, the first image component and the second image component being superimposed in the second superimposed image, the first image component corresponding to an object point radiating first light, and the second image component corresponding to an object point radiating second light, the data structure comprising:

a first image formed by an object point radiating the first light;

a second image formed by an object point radiating the second light;

a first superimposed image created by superimposing the first image and the second image; and correspondence information representing a correspondence between the first image, the second image, and the first superimposed image, and the image processing model being trained using a combination of the first image, the second image, the first superimposed image, and the correspondence information as training data.

* * * * *